(12) United States Patent
Yaginuma et al.

(10) Patent No.: US 12,260,283 B2
(45) Date of Patent: Mar. 25, 2025

(54) WIRELESS TAG COMMUNICATION DEVICE

(71) Applicant: TOSHIBA TEC KABUSHIKI KAISHA, Tokyo (JP)

(72) Inventors: Jun Yaginuma, Izunokuni Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 17/993,580

(22) Filed: Nov. 23, 2022

(65) Prior Publication Data
US 2023/0297788 A1 Sep. 21, 2023

(30) Foreign Application Priority Data
Mar. 18, 2022 (JP) .................. 2022-044293

(51) Int. Cl.
*G06K 7/10* (2006.01)
*H04N 5/272* (2006.01)

(52) U.S. Cl.
CPC ......... *G06K 7/10128* (2013.01); *H04N 5/272* (2013.01)

(58) Field of Classification Search
CPC ........... G06K 7/10128; G06K 7/10316; G06K 7/10336; G06K 19/0723; G06K 7/10; H04N 5/272; H04B 5/77; H04B 2001/0416; H04B 3/52; H04B 1/3838; H04B 17/12; H01Q 1/243; H01Q 21/28; H01Q 7/00; H01Q 9/0407; G01S 7/415; G01S 13/867; H04W 4/80; H04W 4/029; G01V 3/30; G01V 3/12
See application file for complete search history.

(56) References Cited

U.S. PATENT DOCUMENTS

2015/0235064 A1* 8/2015 Johannesen .......... G06Q 10/087
340/10.1
2021/0247313 A1* 8/2021 Ogawa ................... B64U 20/87
2021/0264119 A1   8/2021 Suzuki

FOREIGN PATENT DOCUMENTS

JP    2013-070341 A    4/2013
JP    2014-142721 A    8/2014

* cited by examiner

*Primary Examiner* — Xilin Guo
(74) *Attorney, Agent, or Firm* — FOLEY & LARDNER LLP

(57) ABSTRACT

A wireless tag communication device includes an antenna, a communication control circuit, a camera, a sensor, and a processor. The antenna has directivity. The communication control circuit communicates with a wireless tag via the antenna. The camera captures an image in which a direction in which the directivity of the antenna is maximized coincides with a capturing direction. The sensor detects brightness in a first image captured by the camera. The processor calculates a detection position of a wireless tag as a search target in the first image and displays on a display the first image and a second image in which the first image is masked with a mask density according to a sensor value detected by the sensor in an area other than an explicit area with the detection position of the wireless tag as a base point.

16 Claims, 8 Drawing Sheets

WIRELESS TAG COMMUNICATION DEVICE

CROSS-REFERENCE TO RELATED APPLICATION

This application is based upon and claims the benefit of priority from Japanese Patent Application No. 2022-044293, filed on Mar. 18, 2022, the entire contents of which are incorporated herein by reference.

FIELD

Embodiments described herein relate generally to a wireless tag communication device.

BACKGROUND

In a recent year, there is a wireless tag communication device intended to read an RFID tag (hereinafter also referred to as a wireless tag) at an unspecified position. The wireless tag communication device communicates with a specific RFID tag while changing an orientation of an antenna by an operator's operation. The wireless tag communication device estimates a direction in which the specific RFID tag exists based on a communication status with the specific RFID tag. The wireless tag communication device of the related art notifies the operator of the direction in which the RFID tag exists by displaying a guidance screen including an estimated result of the direction in which the RFID tag exists on a display.

The operator searches for an RFID tag or an article attached with the RFID tag while moving in the direction indicated on the display. However, the operator needs to become used to actually finding the RFID tag by relying on the direction of the RFID tag displayed on the guidance screen displayed by the wireless tag communication device of the related art. A wireless tag communication device is desired to display the position where an RFID tag exists so that an operator can easily recognize it intuitively so that the operator can easily find the RFID tag.

DETAILED DESCRIPTION

To solve the problems described above, an object is to provide a wireless tag communication device capable of displaying guidance that is intuitively easy for an operator to understand.

In general, according to at least one embodiment, a wireless tag communication device includes an antenna, a communication control circuit, a camera, a sensor, and a processor. The antenna has directivity. The communication control circuit communicates with a wireless tag via the antenna. The camera captures an image in which a direction in which the directivity of the antenna is maximized coincides with a capturing direction. The sensor detects brightness in a first image captured by the camera. The processor calculates a detection position of a wireless tag as a search target in the first image and displays on a display the first image and a second image in which the first image is masked with a mask density according to a sensor value detected by the sensor in an area other than an explicit area with the detection position of the wireless tag as a base point.

Hereinafter, at least one embodiment will be described with reference to the drawings.

First, a configuration of a wireless tag communication device (wireless tag reading device) 10 according to at least one embodiment will be described.

Figure 1:
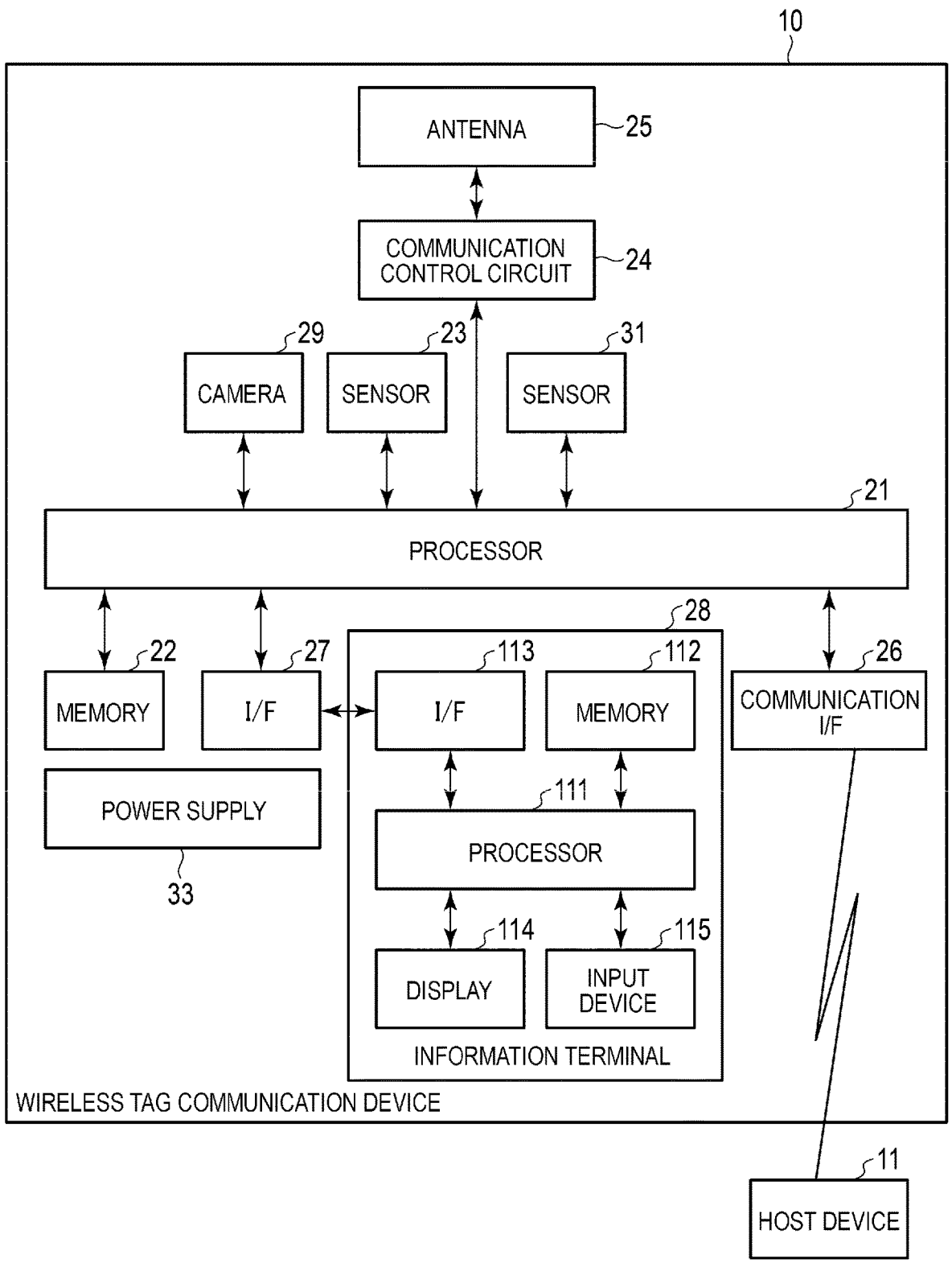
FIG. 1 is a block diagram schematically illustrating a configuration example of a control system in a wireless tag communication device according to at least one embodiment.

FIG. 1 is a block diagram schematically illustrating a configuration example of the wireless tag communication device 10 according to at least one embodiment.

The wireless tag communication device 10 according to the embodiment is a device that communicates with RFID tags (wireless tags). The wireless tag communication device 10 is a wireless tag reading device that reads tag information recorded on an RFID tag by communicating with the RFID tag. The wireless tag communication device 10 estimates information about a position such as a direction in which the RFID tag exists from a reading result of the RFID tag. The wireless tag communication device 10 displays on a display 114 an image showing the position where the estimated RFID tag exists.

The RFID tag is a wireless communication device that operates with radio waves (output signals) from the wireless tag communication device 10. The RFID tag includes a processor, a memory, a communication circuit, an antenna, and the like. The RFID tag outputs a response signal containing tag information recorded in its own memory in response to a read command from the wireless tag communication device 10. For example, the RFID tags are attached to articles such as merchandise items or parts. Tag information including information specifying the merchandise item is recorded in an internal memory of the RFID tag attached to the merchandise item.

An operator operates the wireless tag communication device 10 according to the embodiment. The wireless tag communication device 10 is a device that changes an orientation of an antenna 25 used for communication with the RFID tag by an operator's operation. For example, the wireless tag communication device 10 is a handheld-type device that is operated by an operator. Also, the wireless tag communication device 10 may be mounted on a moving body in which an operator operates the direction of the antenna.

The wireless tag communication device 10 according to the embodiment reads the RFID tag attached to the article while changing the position and orientation by the operation of the operator. The wireless tag communication device 10 reads the tag information recorded on the RFID tag by receiving a response signal from the RFID tag existing within a reading range. The wireless tag communication device 10 also acquires information such as an RSSI value and a phase value detected from the response signal from the RFID tag. The wireless tag communication device 10 stores information such as the RSSI value and the phase value together with the tag information as the reading result of the RFID tag.

For example, the wireless tag communication device 10 is operated as a search device for searching for articles with RFID tags in a predetermined area such as a warehouse or a store. The wireless tag communication device 10 as a search device continuously reads RFID tags as search targets while changing its position and orientation by the operation of the operator.

The wireless tag communication device 10 estimates the direction (tag direction) in which the RFID tag exists based on wireless communication with the RFID tag as the search target. Also, the wireless tag communication device 10 estimates the position (position of the own device) of the wireless tag communication device 10 based on the image captured by a camera 29 and the information detected by a sensor 23. Further, the wireless tag communication device 10 estimates the position (detection position) where the RFID tag exists based on an estimation result of a direction of the tag in time series and an estimation result of the position of the own device. The wireless tag communication device 10 displays the estimated position of the RFID tag on the display 114 as an image that can be intuitively recognized by the operator.

In the configuration example illustrated in FIG. 1, the wireless tag communication device 10 includes a processor 21, a memory 22, the sensor 23, a communication control circuit 24, the antenna 25, a communication interface (I/F) 26, an interface 27, an information terminal 28, the camera 29, the sensor 31, and a power supply 33.

The processor 21 controls each part. The processor 21 includes, for example, an arithmetic circuit such as a CPU. The processor 21 implements control of each part and various data processing by executing programs. The processor 21 may also include an internal memory. The processor 21 executes various processes by executing programs stored in the memory 22 or the like.

The memory 22 includes various memories. For example, the memory 22 includes memories such as ROM, RAM, and NVM. The ROM is a non-volatile memory that cannot be rewritten. The ROM stores programs and the like executed by the processor 21. The RAM is a volatile memory that temporarily stores data. The RAM operates as a working memory or a buffer memory. The NVM is a rewritable non-volatile memory. The NVM stores information such as control information, setting information, and processing results.

Also, the NVM of the memory 22 stores various programs for the processor 21 to execute each process described below. For example, the memory 22 stores a program for executing a process for estimating the position (tag position) of the RFID tag as the search target. In addition, the memory 22 stores a program for executing a process for estimating the direction of the tag and a program for executing a process for estimating the position of the own device in relation to the estimation processing of the tag position.

The memory 22 stores programs and the like for executing display processing for displaying a guidance screen corresponding to the tag position on the display 114. In addition, the memory 22 stores a program for executing image processing for generating a second image indicating the tag position in relation to the guidance screen display processing. The memory 22 stores a program for masking an image captured by the camera 29 with a density corresponding to a sensor value measured by the sensor 31 in relation to the process of generating the second image. The memory 22 stores a program for displaying a second image such as a mark image indicating the tag position in a color corresponding to the color information of the image captured by the camera 29 or a guidance image. In addition, the memory 22 may store a plurality of patterns of second images that can be displayed as mark images or operation guidance images indicating the tag positions.

The sensor 23 is a sensor that detects the motion of the wireless tag communication device 10. For example, the sensor 23 is an acceleration sensor, a gyro sensor, or a geomagnetism (azimuth) sensor. The sensor 23 may be configured to include a plurality of types of sensors. The sensor 23 may be configured to be provided in the information terminal 28 or may include a sensor with which the information terminal 28 is provided.

The communication control circuit 24 and the antenna 25 form an RFID interface that communicates with RFID tags.

The communication control circuit 24 includes a control circuit for communicating with the RFID tag via the antenna 25. The communication control circuit 24 causes the antenna 25 to transmit a transmission signal (radio waves) supplied from the processor 21 with a set output value. The antenna 25 outputs the transmission signal supplied from the communication control circuit 24 as radio waves that can be received by the RFID tag.

The communication control circuit 24 not only outputs transmission signals to the antenna 25, but also supplies signals received by the antenna 25 to the processor 21 as reception data. The communication control circuit 24 receives a response signal from the RFID tag through the antenna 25, processes the response signal (received signal) received by the antenna 25, and supplies it to the processor 21. For example, the communication control circuit 24 supplies to the processor 21 the tag information included in the received signal from the RFID tag, and the RSSI value and phase value indicating the intensity of the received signal.

The communication I/F 26 is an interface for communicating with an external device. The communication I/F 26 is a communication interface for communicating with a host device 11 such as a server. The communication I/F 26 may be an interface for wired communication or an interface for wireless communication.

The interface 27 is an interface for connecting with the information terminal 28. The interface 27 may be anything as long as it corresponds to an interface provided in the information terminal 28. For example, the interface 27 may be a universal serial bus (USB) interface or anything that physically contacts and connects to the interface such as a Lan interface provided in the information terminal 28. Also, the interface 27 may be an interface capable of wireless communication connection such as a Bluetooth (registered trademark) interface or a Wi-Fi (registered trademark) interface.

The information terminal 28 may be equipment including the display 114, an input device 115, and the like. The information terminal 28 is a user interface for outputting information to be presented to the operator and for inputting information instructed by the operator. The information terminal 28 may be, for example, a portable information processing device such as a smart phone or a tablet PC.

In the configuration example illustrated in FIG. 1, the information terminal 28 includes a processor 111, a memory 112, an interface (I/F) 113, the display 114, the input device 115, and the like.

The processor 111 performs control of each part, data processing, and the like. The processor 111 is, for example, a CPU. The processor 111 implements various operations by executing programs stored in the memory 112. The processor 111 may execute part or all of the processing executed by the processor 21, which will be described below.

The interface 113 is an interface (second communication interface) for communicating with the processor 21. The interface 113 may be anything as long as it corresponds to the interface 27. For example, the interface 113 is an interface such as LAN, USB, Bluetooth, or Wi-Fi.

The display 114 is a device that displays information. For example, the display 114 displays the detection result (for example, the position of the RFID tag) of the RFID tag. The input device 115 is a device for the operator to input operation instructions and the like. The display 114 and the input device 115 are configured by, for example, a display device with a touch panel.

The sensor 31 is a sensor that detects brightness or illuminance in an image (first image) captured by the camera 29.

The camera 29 captures an image. The camera 29 captures an image of a communication range (reading range) with the RFID tag by the antenna 25. The camera 29 captures an image where a direction in which the directivity of the antenna 25 is maximized is set as a capturing direction. The camera 29 is provided in the wireless tag communication device 10 so that an optical axis in the capturing direction coincides with an axis in the direction in which the directivity of the antenna 25 is maximized. For example, if the direction in which the directivity of the antenna 25 is maximized is set as the orientation of the antenna 25, the camera 29 is configured so that the capturing direction coincides with the direction of the antenna.

The sensor 31 is a sensor that detects brightness or illuminance in an image (first image) captured by the camera 29. For example, the sensor 31 is a brightness sensor that detects the brightness in the image captured by the camera 29. Also, the sensor 31 may be an illuminance sensor that detects the illuminance in a range captured by the camera 29. The sensor 31 may be configured to be provided in the information terminal 28.

The power supply 33 supplies electric power for operating the wireless tag communication device 10. The power supply 33 supplies electric power for operation to each part of the wireless tag communication device 10. In the handheld-type wireless tag communication device 10, the power supply 33 is composed of, for example, a rechargeable battery.

Next, configuration examples of the communication control circuit 24 and the antenna 25 in the wireless tag communication device 10 according to the embodiment will be described in detail.

The communication control circuit 24 has a modulation circuit, a transmission-side amplifier circuit, a coupler, a reception-side amplifier circuit, a demodulation circuit, an output setting circuit, a level detection circuit, and the like. The antenna 25 is connected to the coupler in the communication control circuit 24. The antenna 25 transmits and receives radio waves for communicating with the RFID tag. The communication control circuit 24 processes signals transmitted to and received from the RFID tag via the antenna 25.

The modulation circuit modulates a waveform signal (carrier wave) with input transmission data. The transmission-side amplifier circuit amplifies the output signal of the modulation circuit. The coupler supplies the output signal of the transmission-side amplifier circuit to the antenna 25. With these configurations, the communication control circuit 24 outputs carrier waves modulated with transmission data from the antenna 25.

The RFID tag receives radio waves as transmission signals transmitted from the antenna 25. The RFID tag recognizes, for example, a read command contained in the transmission signals transmitted from the antenna 25. If the RFID tag recognizes the read command, it outputs data (tag information) stored in its own memory by radio waves, for example, by backscatter modulation.

The antenna 25 receives radio waves as a reception signal output by the RFID tag. The communication control circuit 24 acquires the reception signal received by the antenna 25 by the coupler, and supplies the acquired reception signal to the reception-side amplifier circuit. The reception-side amplifier circuit amplifies the reception signal received by the antenna 25. The demodulation circuit demodulates the data (tag information) included in the reception signal amplified by the reception-side amplifier circuit.

The antenna 25 has directivity. The antenna 25 is, for example, a planar antenna. However, the antenna 25 is not limited to any particular configuration. The antenna 25 is arranged so as to transmit electromagnetic waves toward a communication (reading) area centered on the direction (for example, direction a illustrated in FIG. 2) in which the directivity is maximized. The wireless tag communication device 10 is configured so that the direction in which the directivity of the antenna 25 is maximized is the front.

The communication control circuit 24 also sets the intensity (output value) of the signal output by the output setting circuit. The transmission-side amplifier circuit amplifies the signal supplied from the modulation circuit so that the amplified signal has an output value set by the output setting circuit. The antenna 25 emits an output signal (radio waves) having the output value set by the output setting circuit supplied from the transmission-side amplifier circuit via the coupler.

The communication control circuit 24 detects the intensity of the signal input to the reception-side amplifier circuit using the level detection circuit. The reception signal received by the antenna 25 is input through the coupler to the reception-side amplifier circuit. The communication control circuit 24 detects information for specifying the RSSI value indicating the intensity of the reception signal (response signal from the RFID tag) received by the antenna 25 by the level detection circuit.

Next, the external configuration of the wireless tag communication device 10 according to at least one embodiment will be described.

Figure 2:
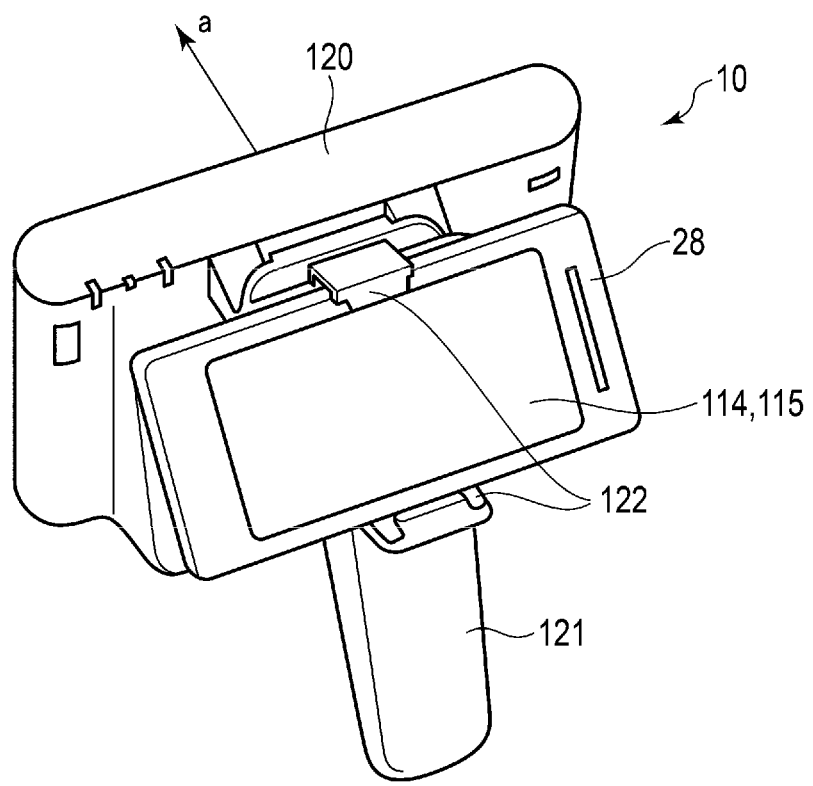
FIG. 2 is an external view illustrating an external configuration example of the wireless tag communication device.

FIG. 2 is a view illustrating an external configuration example of the wireless tag communication device 10 according to at least one embodiment.

The wireless tag communication device 10 illustrated in FIG. 2 is a handheld-type device that is operated while held by an operator. The wireless tag communication device 10 illustrated in FIG. 2 operates, for example, as a search device for searching for RFID tags or articles attached with RFID tags.

In the configuration example illustrated in FIG. 2, the wireless tag communication device 10 is configured to operate with the information terminal 28 set in a reader device (base device) 120. The reader device 120 is a device having configurations other than the information terminal 28 illustrated in FIG. 1. The reader device 120 includes a housing in which the antenna 25 is installed. For example, in the reader device 120, the antenna 25 is provided so as to have the strongest directivity in a direction of the arrow a illustrated in FIG. 2. Here, it is assumed that the direction of the arrow a is a front (forward) direction of the wireless tag communication device 10. Also, it is assumed that the front direction of the wireless tag communication device 10 is set as the orientation of the antenna 25.

The reader device 120 includes a grip portion 121 and a holding portion 122 in addition to the configuration of the control system illustrated in FIG. 1. The grip portion 121 is a portion gripped by an operator. The holding portion 122 is configured by a jig for holding the information terminal 28. The holding portion 122 holds the information terminal 28 so that the display screen of the display 114 faces the operator holding the grip portion 121. The wireless tag communication device 10 is operated by the operator gripping the grip portion 121 in a state where the information terminal 28 is set in the holding portion 122.

The wireless tag communication device 10 continuously reads RFID tags while being operated by the operator. For example, the operator gripping the grip portion 121 changes the position (the position of the own device) of the wireless tag communication device 10 provided with the antenna 25 and the orientation of the antenna. The wireless tag communication device 10 repeatedly reads the RFID tags while estimating the direction (tag direction) in which the RFID tag exists and estimating the position of the own device.

From the reading result of the RFID tag, the wireless tag communication device 10 estimates the direction (tag direction) in which the RFID tag exists. For example, the wireless tag communication device 10 estimates the direction (orientation of the antenna) in which the RSSI value is maximized in the result of reading a specific RFID tag as the tag direction in which the RFID tag exists. Also, the wireless tag communication device 10 may estimate a median value of the range of directions (orientation of the antenna) in which the specific RFID tag can be read as the tag direction in which the RFID tag exists.

The wireless tag communication device 10 estimates the position of the own device using self-estimation technology. In the present embodiment, the wireless tag communication device 10 estimates the position of the own device based on the image captured by the camera 29 and the information detected by the sensor 23 using spatial recognition technology. For example, the wireless tag communication device 10 estimates its own position (position of the own device) by a method of self-position estimation used in augmented reality (AR) technology. However, the method and configuration for estimating the position of the own device used in the wireless tag communication device 10 are not limited to specific ones as long as the self-position can be estimated even indoors.

The wireless tag communication device 10 stores in the memory 22 the result of reading the RFID tag set as the search target. If the wireless tag communication device 10 receives a response signal from the specific RFID tag, the wireless tag communication device 10 stores information such as the tag information, the tag direction, the own device position, the RSSI value, and the phase value as a reading result.

The wireless tag communication device 10 estimates the tag direction of the RFID tag as the search target and estimates the position of the own device. The wireless tag communication device 10 estimates the position where the RFID tag as the search target exists based on the estimated tag direction and the position of the own device. For example, the wireless tag communication device 10 calculates the position (detection position of the tag) of the RFID tag based on the change in the position of the own device and the tag direction estimated at each position. As a specific example, the wireless tag communication device 10 estimates the position of the RFID tag using a triangulation technique from the tag direction estimated at a first position and the tag direction estimated at a second position.

The wireless tag communication device 10 displays an image showing the estimated position of the RFID tag on the display 114. The wireless tag communication device 10 calculates the position (detection position of the tag) of the RFID tag as the search target in the image (first image) captured by the camera 29. The wireless tag communication device 10 displays on the display 114 the image (first image) captured by the camera 29 and the second image indicating the detection position of the tag in the first image.

The second image is a mask image that masks an area other than an explicit area based on the detection position of the tag, or a mark image that indicates the detection position. For example, the wireless tag communication device 10 generates a mask image as the second image indicating the detection position of the tag according to the brightness or illuminance measured by the sensor 31. Further, the wireless tag communication device 10 generates the second image such as a mark image or a guidance image indicating the detection position of the tag using a color corresponding to the color information of the image captured by the camera 29. Also, the wireless tag communication device 10 may select the second image indicating the detection position of the tag from a plurality of patterns of mark images according to the color information of the image captured by the camera 29.

Display examples (first, second, and third display examples) of the guidance screen if the second image is a mask image that masks an area other than the explicit area will be described below.

The mask image as the second image is generated by masking the area (mask area) other than the explicit area with a mask density corresponding to the brightness (or illuminance) in the first image. Mask processing for masking the mask area is image processing for processing the mask area into a translucent image with mask density (transparency) set according to the brightness of the first image. Also, the mask processing may be image processing for blurring the mask area with mask density set according to the brightness of the first image. Further, the mask processing may be image processing for masking the mask area so as to have a bright gradation around the detection position of the tag.

The mask density is set according to the brightness or illuminance in the first image, which is the sensor value detected by the sensor 31. For example, the mask density is set based on the average value or maximum value of brightness in the entire first image measured by the sensor 31. The mask density may be set based on the average value or maximum value of the brightness of the mask area in the first image. Also, the mask density may be set based on the average value or maximum value of the brightness of a predetermined area (guidance display area) in the first image.

Next, a first display example of the guidance screen displayed on the display 114 by the wireless tag communication device 10 according to the embodiment will be described.

Figure 3:
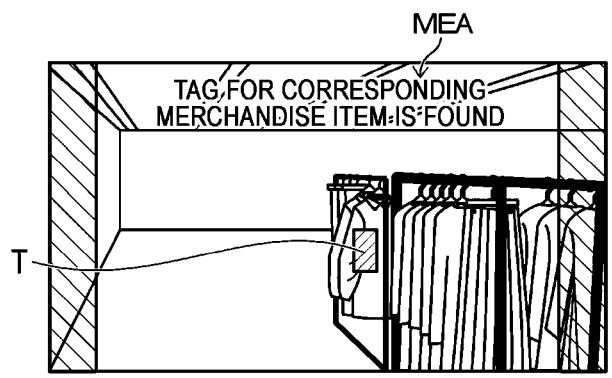
FIG. 3 is a view illustrating a first display example of a guidance screen displayed by the wireless tag communication device.
Figure 4:
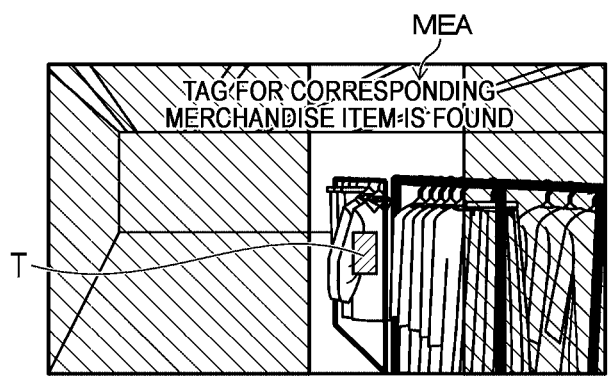
FIG. 4 is a view illustrating the first display example of the guidance screen displayed by the wireless tag communication device.
Figure 5:
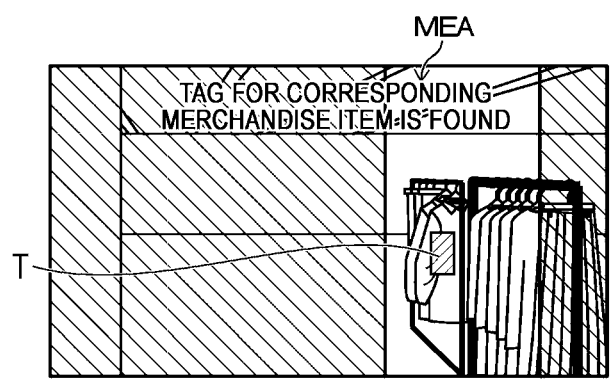
FIG. 5 is a view illustrating the first display example of the guidance screen displayed by the wireless tag communication device.

FIGS. 3, 4, and 5 are views illustrating the first display example of the guidance screen displayed on the display 114 by the wireless tag communication device 10.

FIG. 3 is a first display example of the guidance screen displayed on the display 114 if an RFID tag T as a search target is detected (read). In the first display example illustrated in FIG. 3, the reading range of the RFID tag T in the image (first image) captured by the camera 29 is defined as the explicit area. In the first display example illustrated in FIG. 3, a mask image (second image) obtained by masking an area outside the reading range as a mask area is superimposed on the first image and displayed. The mask image as the second image illustrated in FIG. 3 has mask density (transparency) set according to the brightness measured by the sensor 31.

Further, on the guidance screen of the first display example illustrated in FIGS. 3 to 5, a text message MEA is displayed to guide that the RFID tag T as the search target has been detected (read). In the first display example, the text message MEA is guidance for notifying a user that the RFID tag T (of the merchandise item) as the search target has been found within the range of the first image. In the first display example, the text message MEA is displayed in a predetermined area (guidance display area) set in the upper area of the first image.

FIG. 4 is the first display example of the guidance screen displayed if the direction (tag direction) in which the RFID tag T as the search target exists is narrowed down. In the first display example illustrated in FIG. 4, an explicit area including the estimated tag direction is set in the image captured by the camera 29, and an image (second image) processed by using the other area as a mask area is displayed. That is, if the wireless tag communication device 10 narrows down the tag direction, the display 114 displays (updates) a guidance screen with a narrower explicit area and an enlarged mask area. This makes it easier for the operator to intuitively recognize the area for which the tag direction has been narrowed down.

FIG. 5 is the first display example of the guidance screen displayed if the camera 29 changes its capturing direction. FIG. 5 illustrates an example of a guidance screen transitioned from the guidance screen illustrated in FIG. 4 if the capturing direction of the camera 29 is changed. The processor 21 displays an image captured by the camera 29 at a predetermined frame rate as the first image on the guidance screen. Therefore, if the capturing direction of the camera 29 is changed in a right-left direction by the operator's operation, the first image (the image captured by the camera 29) displayed on the guidance screen changes.

When displaying (updating) the first image in which the capturing direction has changed on the guidance screen, the tag position on the guidance screen also changes. Therefore, the processor 21 updates the mask area displayed as the second image following the change in the capturing direction of the camera 29 displayed on the display 114.

For example, if the capturing direction of the camera 29 changes in the right-left direction, the tag direction with respect to the orientation of the antenna also changes in the right-left direction. The processor 21 changes the explicit area and the mask area on the guidance screen based on the relative position of the tag that changes following the change in the capturing direction of the camera 29. According to the first display example, by changing the mask area following the change in the capturing direction of the camera 29, the explicit area including the tag direction can be displayed in an easy-to-visually recognizable manner.

Next, a second display example of the guidance screen displayed on the display 114 by the wireless tag communication device 10 according to the embodiment will be described.

Figure 6:
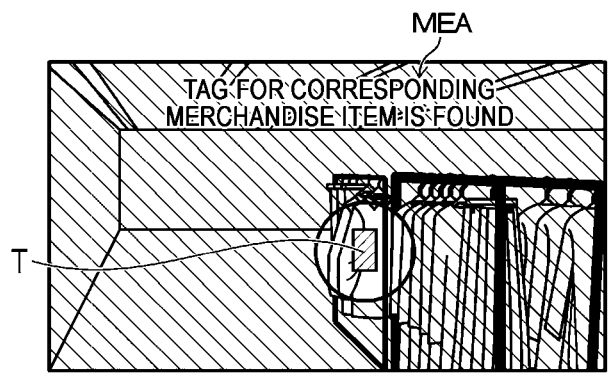
FIG. 6 is a view illustrating a second display example of the guidance screen displayed by the wireless tag communication device.
Figure 7:
FIG. 7 is a view illustrating the second display example of the guidance screen displayed by the wireless tag communication device.
Figure 8:
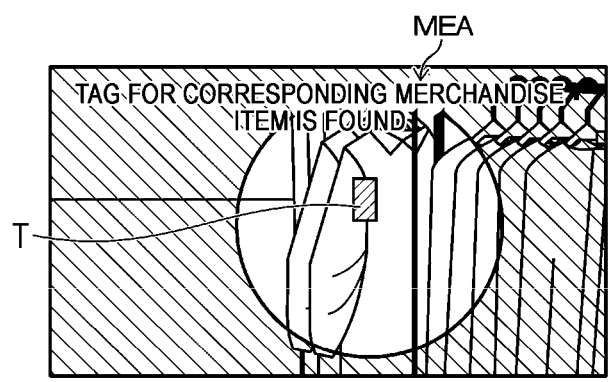
FIG. 8 is a view illustrating the second display example of the guidance screen displayed by the wireless tag communication device.

FIGS. 6, 7 and 8 are views illustrating the second display example of the guidance screen displayed on the display 114 by the wireless tag communication device 10.

The second display example is an example of the guidance screen in which the explicit area changes with the position where the RFID tag T exists as a base point in the image captured by the camera 29. The second display example is an example in which the second image is displayed such that the explicit area becomes larger as the distance to the RFID tag T decreases. In the second display example, it is assumed that the second image is generated by image processing (mask processing) on the mask area as described above.

Further, on the guidance screen of the second display example illustrated in FIGS. 6 to 8, the text message MEA is displayed to guide that the RFID tag T as the search target has been detected (read). The text message MEA in the second display example notifies a user that the RFID tag T (of the merchandise item) as the search target has been found within the range of the first image, as in the first display example. The text message MEA in the second display example is also displayed in a predetermined area (guidance display area) set in the upper area of the first image.

FIG. 6 is the second display example of the guidance screen displayed on the display 114 if the distance to the position of the RFID tag T as the search target is a first distance. FIG. 7 is the second display example of the guidance screen displayed on the display 114 if the distance to the position of the RFID tag T as the search target is a second distance shorter than the first distance. FIG. 8 is the second display example of the guidance screen displayed on the display 114 if the distance to the position of the RFID tag T as the search target is a third distance shorter than the second distance.

On the guidance screen illustrated in FIG. 6, the explicit area is set with a first size corresponding to the first distance in the image captured by the camera 29 with the position (estimated position) of the RFID tag as a base point.

On the guidance screen illustrated in FIG. 7, the explicit area with the position of the RFID tag as the base point in the image captured by the camera 29 is set to a second size corresponding to the second distance. In the second display example, the second size corresponding to the second distance is greater than the first size corresponding to the first distance.

Also, the first image displayed on the guidance screen illustrated in FIG. 7 is an image that is enlarged more than the first image displayed on the guidance screen illustrated in FIG. 6. This is because the distance between the camera 29 and the RFID tag is closer if the guidance screen illustrated in FIG. 7 is displayed than when the guidance screen illustrated in FIG. 6 is displayed. Therefore, on the guidance screen illustrated in FIG. 7, an image (first image) around the RFID tag T is displayed in a larger size than the guidance screen illustrated in FIG. 6 in the explicit area with the RFID tag as a base point.

In the guidance screen illustrated in FIG. 8, the explicit area with the position of the RFID tag T as the base point in the image captured by the camera 29 is set to a third size corresponding to the third distance. In the second display example, the third size corresponding to the third distance is greater than the second size corresponding to the second distance. Also, the image (first image) in the explicit area displayed on the guidance screen illustrated in FIG. 8 is displayed as an image that is enlarged compared to the image in the explicit area displayed on the guidance screen illustrated in FIG. 7.

In the second display example illustrated in FIGS. 6 to 8, as the operator gripping the wireless tag communication device approaches the target RFID tag T, the explicit area around the RFID tag T is displayed larger. Therefore, the operator can move while surely confirming the surroundings of the target RFID tag T as the operator approaches the target RFID tag T. As a result, the operator can easily find the target RFID tag T even if the operator is unfamiliar with the operation of the device.

Next, a third display example of the guidance screen displayed on the display 114 by the wireless tag communication device 10 according to at least one embodiment will be described.

Figure 9:
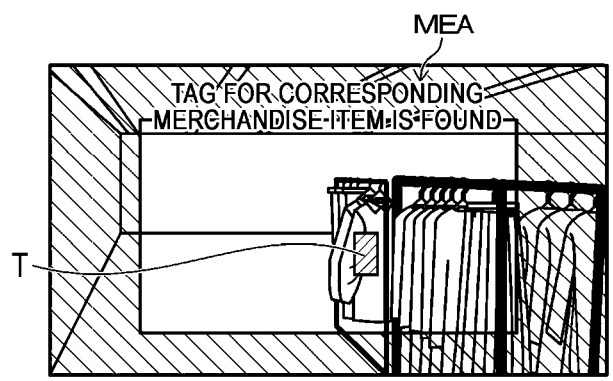
FIG. 9 is a view illustrating a third display example of a guidance screen displayed by the wireless tag communication device.
Figure 10:
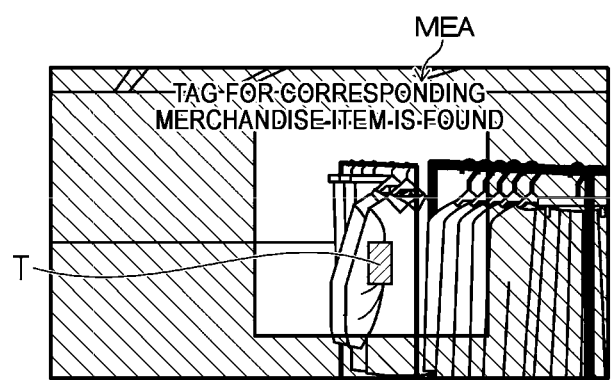
FIG. 10 is a view illustrating the third display example of the guidance screen displayed by the wireless tag communication device.
Figure 11:
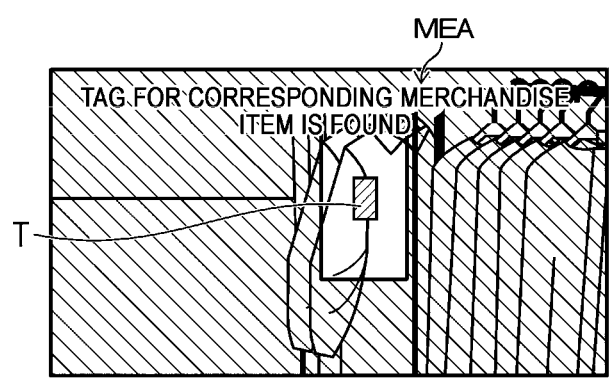
FIG. 11 is a view illustrating the third display example of the guidance screen displayed by the wireless tag communication device.

FIGS. 9, 10, and 11 are views illustrating the third display example of the guidance screen displayed on the display 114 by the wireless tag communication device 10.

The third display example is another example of the guidance screen in which the explicit area changes with the position where the RFID tag T exists as a base point in the image captured by the camera 29. The third display example is an example in which the second image is displayed so that the explicit area becomes smaller as the distance to the RFID tag T becomes closer. In the third display example, it is assumed that the second image is generated by image processing (mask processing) on the mask area as described above.

Also, on the guidance screen of the third display example illustrated in FIGS. 9 to 11, a text is displayed to guide that the RFID tag T as a search target has been detected (read). The guidance displayed in the third display example is displayed in a predetermined area (guidance display area) set in the upper area of the first image.

Also on the guidance screen of the third display example illustrated in FIGS. 9 to 11, a text message MEA is displayed to guide that the RFID tag T as a search target has been detected (read). The text message MEA in the third display example notifies a user that the RFID tag T (of the merchandise item) as the search target has been found within the range of the first image, as in the first display example. The text message MEA in the third display example is also displayed in a predetermined area (guidance display area) set in the upper area of the first image.

FIG. 9 is the third display example of the guidance screen displayed on the display 114 if the distance to the position of the RFID tag T as the search target is a first distance. FIG. 10 is the third display example of the guidance screen displayed on the display 114 if the distance to the position of the RFID tag T as the search target is a second distance shorter than the first distance. FIG. 11 is the third display example of the guidance screen displayed on the display 114 if the distance to the position of the RFID tag T as the search target is a third distance shorter than the second distance.

On the guidance screen illustrated in FIG. 9, the explicit area with the position (estimated position) of the RFID tag T as a base point is set to a first size corresponding to the first distance in the image captured by the camera 29.

On the guidance screen illustrated in FIG. 10, the explicit area with the position of the RFID tag T as a base point is set to a second size corresponding to the second distance in the image captured by the camera 29. In the third display example, the second size corresponding to the second distance is smaller than the first size corresponding to the first distance.

The first image displayed on the guidance screen illustrated in FIG. 10 is an image that is larger than the first image displayed on the guidance screen illustrated in FIG. 9. This is because the distance between the camera 29 and the RFID tag T is closer if the guidance screen illustrated in FIG. 10 is displayed than when the guidance screen illustrated in FIG. 9 is displayed. Therefore, on the guidance screen illustrated in FIG. 10, an image (first image) around the RFID tag T is displayed in an enlarged state as compared with the guidance screen illustrated in FIG. 9 in the explicit area of the second size smaller than the first size.

In the guidance screen illustrated in FIG. 11, the explicit area with the position of the RFID tag T as the base point is set to a third size corresponding to a third distance in the image captured by the camera 29. In the third display example, the third size corresponding to the third distance is smaller than the second size corresponding to the second distance. Further, on the guidance screen illustrated in FIG. 11, an image enlarged from that of the guidance screen illustrated in FIG. 10 is displayed in the explicit area set smaller than the explicit area displayed on the guidance screen illustrated in FIG. 10.

In the third display example illustrated in FIGS. 9 to 11, as the operator gripping the wireless tag communication device approaches the target RFID tag T, the explicit area around the RFID tag T is displayed smaller. Therefore, the closer the operator is to the target RFID tag T, the easier it is to visually recognize the target RFID tag T with pinpoint accuracy. As a result, the operator can move while intuitively narrowing down the position of the RFID tag T on the guidance image, and can easily find the target RFID tag T even if the operator is unfamiliar with the operation of the device.

In the guidance screens of the second display example illustrated in FIGS. 6, 7, and 8, the explicit area is set as a circular area, but the shape of the explicit area is not limited to a specific shape. For example, the explicit area in the guidance screen of the second display example illustrated in FIGS. 6, 7, and 8 may be set in a shape such as a rectangle or a polygon.

Also, in the guidance screens illustrated in FIGS. 9, 10, and 11, the explicit area is set as a rectangular area, but the shape of the explicit area is not limited to a specific shape. For example, the explicit area in the guidance screen of the third display example illustrated in FIGS. 9, 10, and 11 may be set in a shape such as a circle.

Next, a first operation example in which the wireless tag communication device 10 according to the embodiment displays a guidance screen including a second image as a mask image as illustrated in the first, second, and third display examples will be described.

Figure 12:
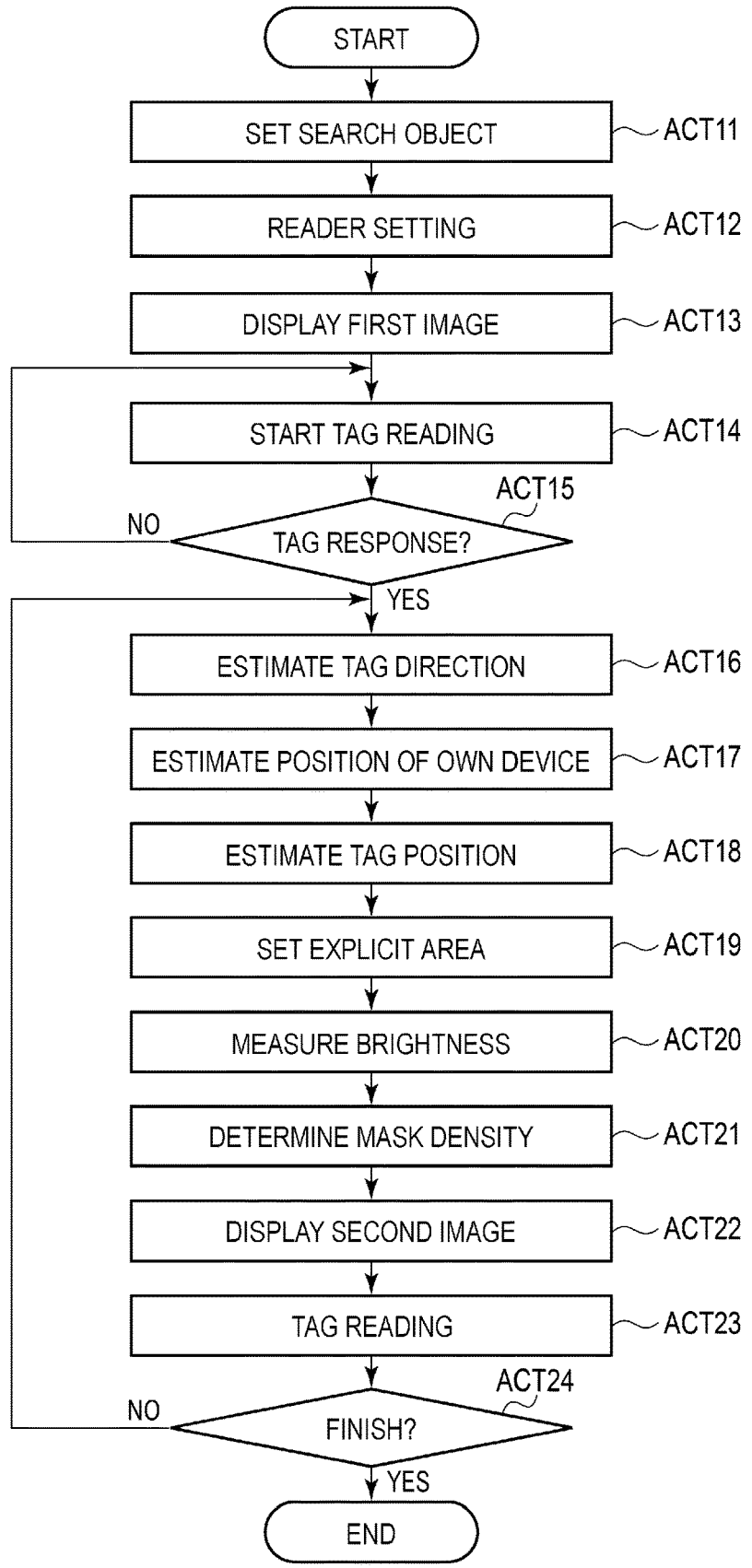
FIG. 12 is a flowchart for illustrating a first operation example of the wireless tag communication device.

FIG. 12 is a flowchart for illustrating the first operation example of the wireless tag communication device 10 according to the embodiment.

The processor 21 of the wireless tag communication device 10 operates in a search mode by operator's operation. In the search mode, the processor 21 receives the setting of the RFID tag as a search target by the operator (ACT 11). The operator uses the input device 115 or the like to specify information indicating the RFID tag as the search target. The processor 21 sets the RFID tag as the search target according to the specifying by the operator.

The processor 21 also accepts various setting instructions for reading the RFID tag as the search target. The operator specifies operation settings for reading the RFID tag using the input device 115 or the like, and the processor 21 sets operation settings for reading the RFID tag according to the specifying by the operator (ACT 12).

The processor 21 of the wireless tag communication device 10 receives an operator's instruction to start searching after executing setting of the RFID tag as the search target and operations. The processor 21 of the wireless tag communication device 10 starts operation (search processing) as a search mode in response to the operator's instruction to start searching.

The processor 21 displays an image (first image) captured by the camera 29 on the display 114 during operation in the search mode (ACT 13). For example, the processor 21 displays on the display 114 an image to be displayed captured by the camera 29 at a predetermined frame rate. The processor 21 causes the display 114 to display the image (first image) captured by the camera 29 as a background image on the guidance screen.

In addition, the processor 21 of the wireless tag communication device 10 executes RFID tag reading processing in response to the operator's instruction to start searching (ACT 14). For example, the processor 21 receives a response from each RFID tag within the reading range (communication range) of the communication control circuit 24 and antenna 25. The processor 21 determines whether the response received from each RFID tag is the response from the RFID tag as the search target (ACT 15). The processor 21 determines whether, from the response received from each RFID tag, the response from the RFID tag as the search target is received (ACT 15). If the RFID tag as the search target has not been read (ACT 15, NO), the processor 21 returns to ACT 14 and repeats reading of the RFID tags.

If the RFID tag as the search target has been read (ACT 15, YES), the processor 21 starts processing for estimating the position of the tag and processing for displaying the second image corresponding to the tag position. The wireless tag communication device 10 according to the present embodiment estimates the position of the RFID tag as the search target based on the tag direction and the position of the own device.

The processor 21 estimates the tag direction as the direction in which the RFID tag as the search target exists (ACT 16). For example, the processor 21 estimates the direction (tag direction) in which the RFID tag as the search target exists based on information such as the RSSI value and the phase value included in the reading result of the RFID tag. In addition, the processor 21 stores the tag direction estimation result in the memory 22.

Also, the processor 21 estimates a current position of the wireless tag communication device as the position of the own device (ACT 17). For example, the processor 21 estimates the position of the own device from the image captured by the camera 29 and the detection result of the sensor 23 using spatial recognition technology. Further, the processor 21 associates the estimation result of the position of the own device with the estimation result of the tag direction and stores them in the memory 22.

After estimating the tag direction and the position of the own device, the processor 21 estimates the tag position as the position (detection position) where the RFID tag as the search target exists (ACT 18). The processor 21 estimates the position (detection position) where the RFID tag exists based on the estimated tag direction and the position of the own device. For example, the processor 21 calculates the detection position based on a plurality of positions (estimated positions) of the own device obtained in time series and the tag direction at each estimated position.

The processor 21 sets an explicit area including the detection position as the position where the RFID tag as the search target exists based on the estimation result of the tag position (ACT 19). That is, the processor 21 specifies the position (detection position of the tag) where it is estimated that the RFID tag as the search target exists in the image (first image) captured by the camera 29. Here, the processor 21 determines the size, shape, and the like of the explicit area with the detection position of the tag as the base point in the first image. For example, the processor 21 may determine the size, shape, and the like of the explicit area according to the distance (estimated distance) between the position of the own device and the RFID tag as the search target. As a result, the processor 21 sets the explicit area with the detection position of the specified tag as the base point in the first image.

If the explicit area indicating the detection position of the tag is set, the processor 21 causes the sensor 31 to measure the brightness or illuminance in the first image (ACT 19). The processor 21 determines the density (mask density) for masking the area other than the explicit area based on the brightness or illuminance as the sensor value measured by the sensor 31 (ACT 20). In the first operation example, as illustrated in FIGS. 3 to 11, the second image is a mask image in which the area other than the explicit area is masked with the mask density (transparency) according to the brightness in the first image.

For example, the processor 21 measures the brightness (average value or maximum value) of the entire first image. When measuring the brightness of the entire first image, the processor 21 sets the mask density according to the brightness of the entire first image. In this case, the processor 21 can generate the second image in which the mask area is masked with the mask density that is easy to see according to the brightness of the entire first image.

The processor 21 may also measure the brightness (average value or maximum value) of the area (masked area) other than the explicit area in the first image. When measuring the brightness of the area other than the explicit area in the first image, the processor 21 sets the mask density according to the brightness of the area other than the explicit area in the first image. In this case, the processor 21 can generate the second image masked with the mask density that makes the area other than the explicit area easier to see.

Also, the processor 21 may measure the brightness (average value or maximum value) of a predetermined area in the first image. When measuring the brightness of the predetermined area in the first image, the processor 21 sets the mask density according to the brightness of the predetermined area (guidance display area) in the first image. For example, the processor 21 measures the brightness of the guidance display area that displays the guidance using characters or images on the first image. When measuring the brightness of the predetermined area, the processor 21 sets the mask density according to the brightness of the predetermined area. In this case, the processor 21 can generate the second image masked with the mask density that makes it easier to see information displayed in the predetermined area such as the guidance display area.

After setting the mask density, the processor 21 causes the display 114 to display the first image and the second image indicating the explicit area (detection position) in the first image (ACT 20). For example, the processor 21 generates the second image in which the area other than the explicit area is masked with the mask density set according to the brightness measured by the sensor 31. The processor 21 updates the guidance screen displayed on the display 114 by superimposing the second image on the image (first image) captured by the camera 29. For example, the processor 21 displays the image (first image) captured by the camera 29 on the display 114 in real time. The processor 21 displays the second image in which the area other than the explicit area in the first image is masked with the mask density set according to the brightness of the first image, superimposed on the first image.

After updating the guidance screen displayed on the display 114, the processor 21 again executes reading processing for reading the RFID tag as the search target (ACT 23). Here, the processor 21 finishes a series of search processing if there is an instruction to finish or stop the search processing (ACT 24, YES).

After reading the RFID tag, the processor 21 proceeds to ACT 16 unless there is an instruction to finish the search (ACT 24, NO) and repeats the above-described processing. The processor 21 repeats the estimation of the tag position and repeats the process of displaying the guidance screen in which the area other than the explicit area indicating the detection position of the tag is masked with the mask density according to the brightness. As a result, the display 114 displays the first image captured by the camera and the second image indicating the tag position updated as the own device moves in the explicit area.

As described above, in the first operation example, the processor of the wireless tag communication device calculates the detection position of the tag as the search target using the detection result of the direction of the target wireless tag and the position of the own device. The processor displays on the display a guidance screen in which the area other than the explicit area indicating the detection position of the tag is masked with the mask density according to the brightness in the image captured by the camera. According to the first operation example, the wireless tag communication device can display the guidance screen in which the masked image area is easy to see and the position of the RFID tag as the search target is intuitively understandable.

Also, in the first operation example, the processor of the wireless tag communication device changes the set size of the explicit area indicating the detection position of the tag according to the distance between the position of the own device and the target wireless tag. According to the first operation example, the wireless tag communication device can guide the relative distance to the position of the RFID tag as the search target in an intuitive and easy-to-understand manner on the guidance screen masked with the density that is easy to see.

A display example of displaying a guidance screen including a second image such as a mark image indicating the detection position of the tag or an operation guidance image will be described below.

For example, the mark image as the second image may be an image indicating the position (detection position of the tag) of the RFID tag as the search target in the image captured by the camera 29. In the present embodiment, the mark image as the second image is displayed in an easily visible color even if it is superimposed on the image captured by the camera 29. That is, the wireless tag communication device 10 displays the mark image as the second image on the display 114 in a color set according to the color information of the image captured by the camera 29. For example, the mark image as the second image is generated with the color set according to the color information of the image captured by the camera 29. Also, the mark image as the second image may be selected from a plurality of patterns of mark images previously stored according to the color information of the image captured by the camera 29.

Also, the operation guidance image as the second image is displayed in an easily visible color even if it is superimposed on the image (first image) captured by the camera 29, similarly to the mark image described above. That is, the wireless tag communication device 10 may display the operation guidance image as the second image on the display 114 in the color set according to the color information of the image captured by the camera 29.

Next, a fourth display example of the guidance screen displayed on the display 114 by the wireless tag communication device 10 according to at least one embodiment will be described.

Figure 13:
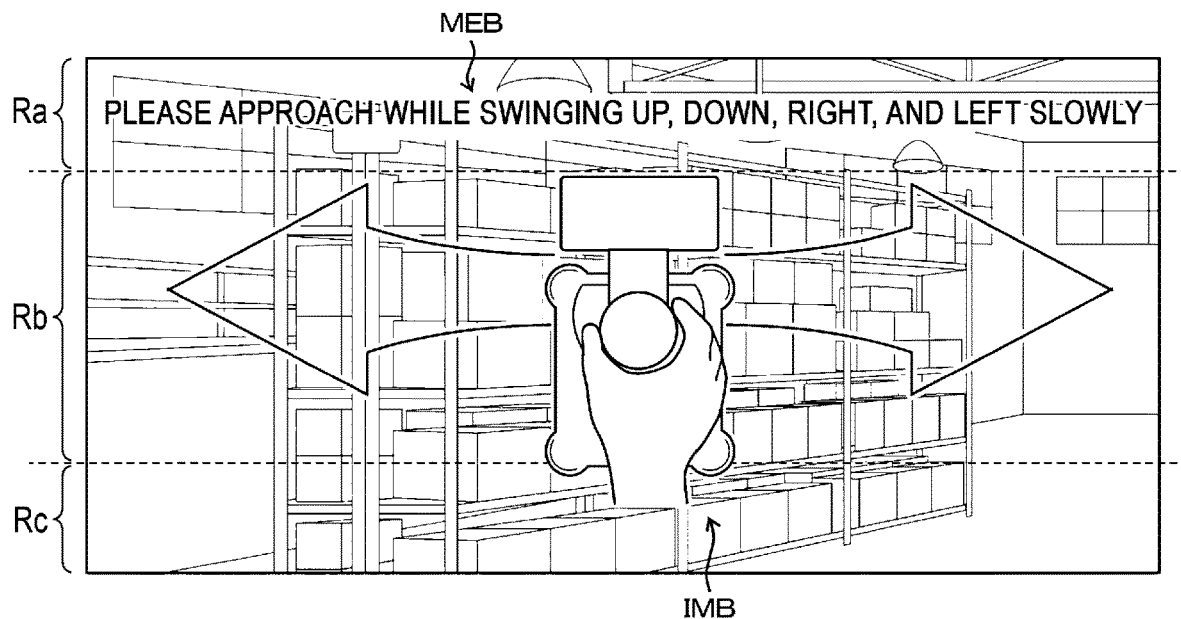
FIG. 13 is a view illustrating a fourth display example of the guidance screen displayed by the wireless tag communication device.

FIG. 13 is a view illustrating the fourth display example in which the wireless tag communication device 10 displays a guidance screen including an operation guidance image as the second image on the display 114.

The fourth display example illustrated in FIG. 13 is an example of the guidance screen displaying an operation guidance image (operation guide image IMB and text message MEB) as the second image on the image (first image) captured by the camera 29. In the example illustrated in FIG. 13, the operation guide image IMB displays an image prompting a user to change the orientation of the wireless tag communication device 10. Further, the text message MEB notifies the user of the operation guidance of the wireless tag communication device 10 in characters.

The colors to be displayed are set for the operation guide image IMB and the text message MEB based on the color information in the first image. For example, the memory 22 stores image data for displaying the operation guide image IMB and the text message MEB as the second image superimposed on the first image. The wireless tag communication device 10 displays the operation guide image IMB and the text message MEB stored in the memory 22 on the display 114 in colors based on the color information in the first image.

Further, the memory 22 may store a plurality of patterns of display components (image data) that can be displayed as the operation guide image IMB and the text message MEB. The plurality of patterns of display components are, for example, image data of operation guide images composed of a plurality of colors and image data of text messages composed of a plurality of colors. The wireless tag communication device 10 may select the display component to be displayed as the operation guide image IMB or the text message MEB according to the color information in the first image.

Further, the wireless tag communication device 10 may divide the first image into a plurality of areas and generate (or select) a second image having a color according to color information in each divided area. For example, the wireless tag communication device 10 is divided into three areas Ra, Rb, and Rc as illustrated in FIG. 13. In the example illustrated in FIG. 13, the area Ra is an area for displaying the text message MEB, and the area Rb is an area for displaying the operation guide image IMB.

In the example illustrated in FIG. 13, the wireless tag communication device 10 generates (selects) the text message MEB with the color according to the color information of the area Ra in the first image. As a result, the wireless tag communication device 10 can display the text message MEB as the second image in an easily visible color on the first image.

Further, in the example illustrated in FIG. 13, the wireless tag communication device generates (selects) the operation guide image IMB with the color according to the color information of the area Rb in the first image. As a result, the wireless tag communication device can display the operation guide image IMB as the second image in the easily visible color on the first image.

Figure 14:
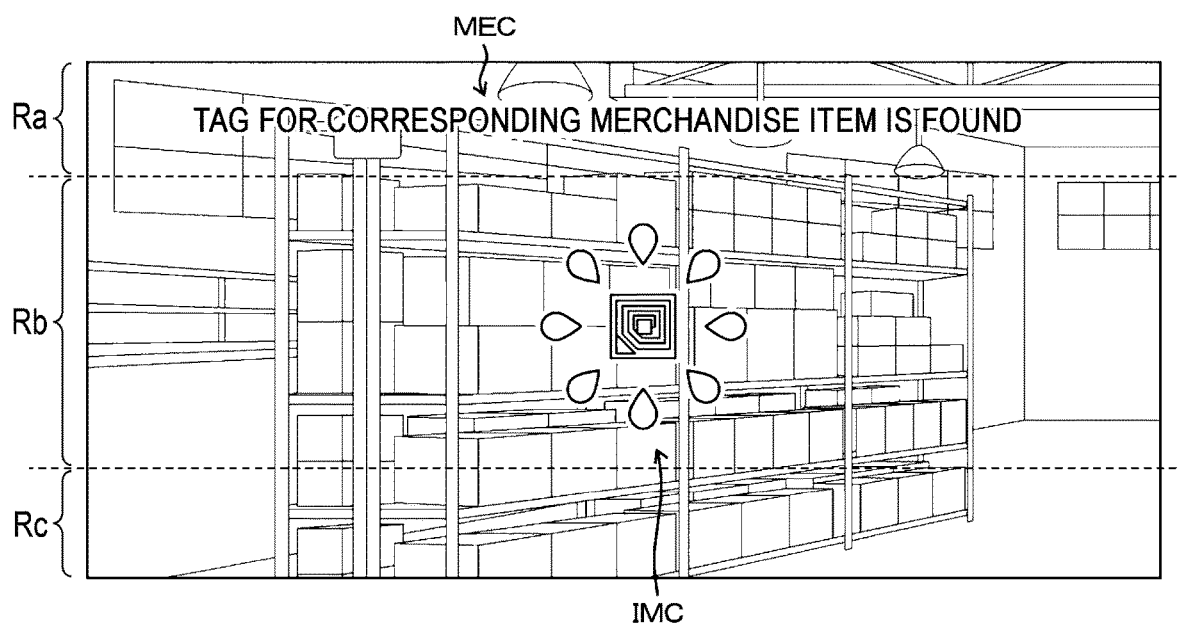
FIG. 14 is a view illustrating the fourth display example of the guidance screen displayed by the wireless tag communication device.

FIG. 14 is a view illustrating a fifth display example in which the wireless tag communication device 10 displays a guidance screen including a mark image as the second image on the display 114.

The fifth display example illustrated in FIG. 14 is an example of a guidance screen displaying a mark image IMC and a text message MEC superimposed on the first image. In the example illustrated in FIG. 14, the mark image IMC is an image indicating the detection position of the tag in the first image. Further, the text message MEC notifies in characters that a merchandise item attached with an RFID tag as the search target has been detected.

The mark image IMC and the text message MEC are set to display colors based on the color information in the first image. For example, the memory 22 stores image data for displaying the mark image IMC and the text message MEC as the second image superimposed on the first image. The wireless tag communication device 10 displays the mark image IMC and the text message MEC stored in the memory 22 on the display 114 in colors based on the color information in the first image.

The memory 22 may store a plurality of patterns of display components (image data) that can be displayed as the mark images IMC and the text messages MEC. The plurality of patterns of display components are, for example, image data of a mark image composed of a plurality of colors and image data of a text message composed of a plurality of colors. The wireless tag communication device 10 may select image data to be displayed as the mark image IMC and the text message MEC according to the color information in the first image.

Further, the wireless tag communication device 10 may generate (or select) the second image with the color according to the color information of the first image for each of areas Ra, Rb, and Rc illustrated in FIG. 14. In the example illustrated in FIG. 14, the area Ra is an area for displaying the text message MEC, and the area Rb is an area for displaying the mark image IMC.

In the example illustrated in FIG. 14, the wireless tag communication device 10 generates (selects) the text message MEC with the color according to the color information of the area Ra in the first image. As a result, the wireless tag communication device 10 can display the text message MEC as the second image in an easily visible color on the first image.

Further, in the example illustrated in FIG. 14, the wireless tag communication device 10 generates (selects) the mark image IMC indicating the detection position of the tag with a color according to the color information of the area Rb in the first image. As a result, the wireless tag communication device 10 can display the mark image IMC as the second image in an easily visible color on the first image.

Next, a second operation example in which the wireless tag communication device 10 according to the embodiment displays a guidance screen including a second image as illustrated in the fourth, and fifth display examples will be described.

Figure 15:
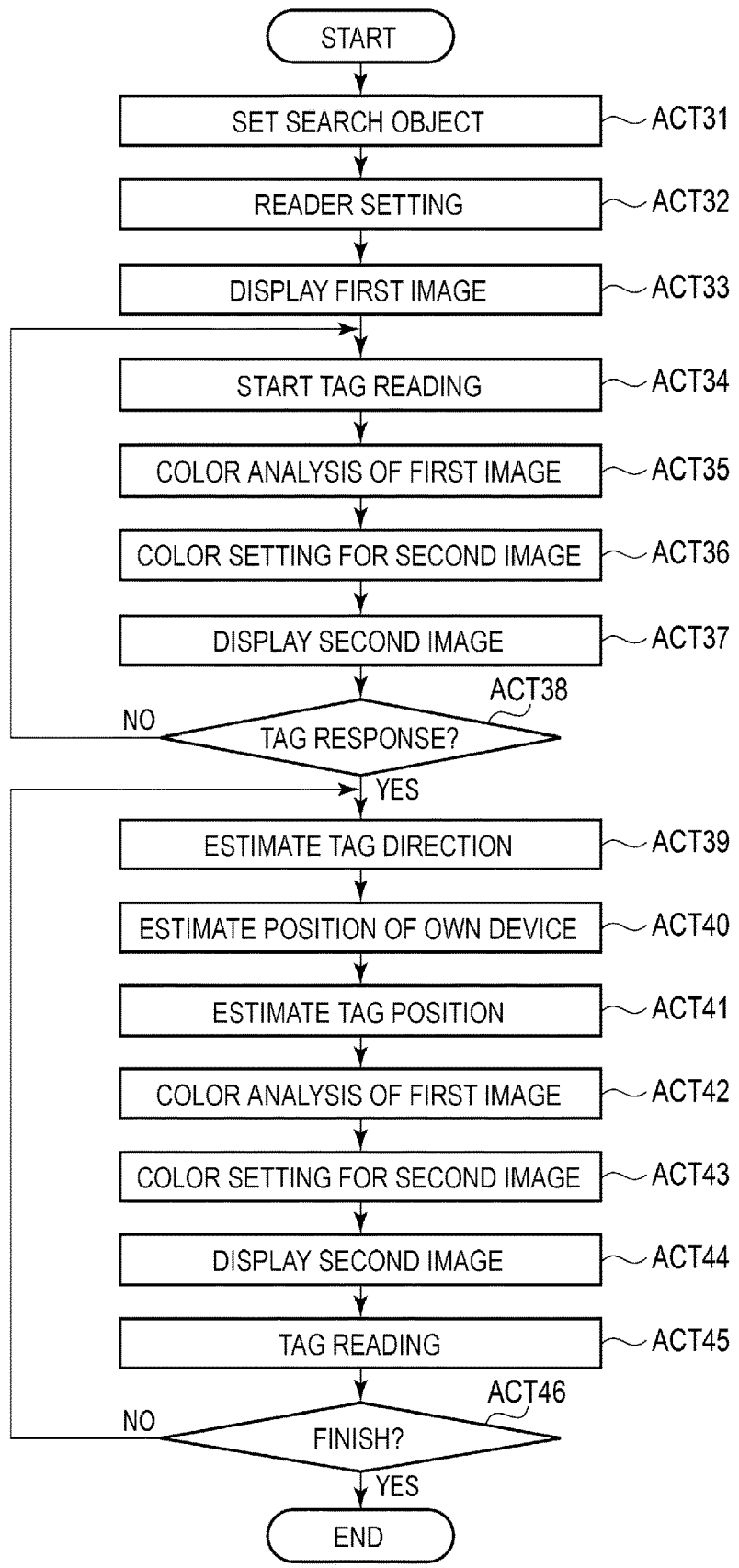
FIG. 15 is a flowchart for illustrating a second operation example of the wireless tag communication device.

FIG. 15 is a flowchart for illustrating the second operation example of the wireless tag communication device 10 according to the embodiment.

The processor 21 of the wireless tag communication device 10 operates in a search mode by operator's operation. In the search mode, the processor 21 receives the setting of the RFID tag as a search target by the operator (ACT 31). The operator uses the input device 115 or the like to specify information indicating the RFID tag as the search target. The processor 21 sets the RFID tag as the search target according to the specifying by the operator.

The processor 21 also receives various setting instructions for reading the RFID tag as the search target. The operator specifies operation settings for reading the RFID tag using the input device 115 or the like, and the processor 21 sets operation settings for reading the RFID tag according to the specifying by the operator (ACT 32).

The processor 21 of the wireless tag communication device 10 receives an operator's instruction to start searching after executing setting of the RFID tag as the search target and operations. The processor 21 of the wireless tag communication device 10 starts operation (search processing) as a search mode in response to the operator's instruction to start searching.

The processor 21 displays an image (first image) captured by the camera 29 on the display 114 during operation in the search mode (ACT 33). For example, the processor 21 displays on the display 114 an image to be displayed captured by the camera 29 at a predetermined frame rate. The processor 21 causes the display 114 to display the image (first image) captured by the camera 29 as a background image on the guidance screen.

In addition, the processor 21 of the wireless tag communication device 10 executes RFID tag reading processing in response to the operator's instruction to start searching (ACT 34). For example, the processor 21 receives a response from each RFID tag within the reading range (communication range) of the communication control circuit 24 and antenna 25.

When reading of the RFID tag is started, the processor 21 of the wireless tag communication device 10 analyzes the color information in the image (first image) captured by the camera 29 (ACT 35). The processor 21 sets the color of the second image such as the text message and the operation guidance image to be displayed on the first image based on the color information in the first image (ACT 36). After setting the color of the second image, the processor 21 displays on the display 114 a guidance screen in which the second image of the set color is superimposed on the first image (ACT 37).

For example, the processor 21 divides the first image into predetermined areas and acquires the color information of each divided area. The processor 21 displays the second image such as a text message or an operation guidance image in a color set according to the color information of each area. The processor 21 may calculate lightness as color information in the first image.

The area where the color is analyzed may be set according to the display position of the second image displayed superimposed on the first image. For example, when displaying the guidance screen illustrated in FIG. 13, the processor 21 sets separate areas for the display area of the text message MEB and the display area of the operation guidance image IMB. In this case, the processor 21 can display the text message in a color according to the color information in the display area of the text message MEB. Also, the processor 21 can display the operation guidance screen in a color according to the color information in the display area of the operation guide image IMB.

After starting to read the RFID tag, the processor 21 determines whether the response received from each RFID tag is the response from the RFID tag as the search target (ACT 38). The processor 21 determines whether, from the response received from each RFID tag, the response from the RFID tag as the search target is received (ACT 38). If the RFID tag as the search target has not been read (ACT 38, NO), the processor 21 returns to ACT 34 and repeats reading of the RFID tags.

If the RFID tag as the search target has been read (ACT 38, YES), the processor 21 starts processing for estimating the position of the tag and processing for displaying the second image indicating the position of the tag. The wireless tag communication device 10 according to at least one embodiment estimates the position of the RFID tag as the search target based on the tag direction and the position of the own device.

The processor 21 estimates the tag direction as the direction in which the RFID tag as the search target exists (ACT 39). For example, the processor 21 estimates the direction (tag direction) in which the RFID tag as the search target exists based on information such as the RSSI value and the phase value included in the reading result of the RFID tag. In addition, the processor 21 stores the tag direction estimation result in the memory 22.

Also, the processor 21 estimates a current position of the wireless tag communication device as the position of the own device (ACT 40). For example, the processor 21 estimates the position of the own device from the image captured by the camera 29 and the detection result of the sensor 23 using spatial recognition technology. Further, the processor 21 associates the estimation result of the position of the own device with the estimation result of the tag direction and stores them in the memory 22.

After estimating the tag direction and the position of the own device, the processor 21 estimates the tag position as the position where the RFID tag as the search target exists (ACT 41). The processor 21 estimates the position (detection position of the tag) where the RFID tag exists based on the estimated tag direction and the position of the own device. For example, the processor 21 calculates the detection position of the tag based on a plurality of positions (estimated positions) of the own device obtained in time series and the tag direction at each estimated position.

After estimating the tag position, the processor 21 analyzes the color information in the image (first image) captured by the camera 29 (ACT 42). The processor 21 sets the colors of the second image such as the mark image and the text message to be displayed on the first image based on the color information in the first image (ACT 43). After setting the color of the second image, the processor 21 displays on the display 114 a guidance screen in which the second image of the set color is superimposed on the first image (ACT 44).

Here, the processor 21 of the wireless tag communication device 10 may divide the first image into predetermined areas and acquire color information of each divided area. Further, the area to be divided may be set according to the display position of the second image to be displayed superimposed on the first image. That is, the processor 21 displays the second image such as the mark image and the text message in the color according to the color information of each area in the first image.

For example, when displaying the guidance screen illustrated in FIG. 14, the processor 21 sets separate areas for the display area of the text message MEC and the display area of the mark image IMC. The processor 21 sets the color for displaying the text message MEC according to the color information of the display area of the text message MEC in the first image. As a result, the processor 21 can display the mark image IMC indicating the detection position of the tag superimposed on the first image in an easy-to-see color. Further, the processor 21 sets the color for displaying the mark image IMC according to the color information of the display area of the mark image IMC in the first image. As a result, the processor 21 can display the mark image indicating the detection position of the tag superimposed on the first image in an easy-to-see color.

After updating the guidance screen displayed on the display 114, the processor 21 again executes reading processing for reading the RFID tag as the search target (ACT 45). Here, the processor 21 finishes a series of RFID tag search processing if there is an instruction to finish or stop the search processing (ACT 46, YES).

The processor 21 proceeds to ACT 39 unless there is an instruction to finish the search for the RFID tag (ACT 46, NO) and repeats the above-described processing. The processor 21 repeats the estimation of the tag position and repeats the process of displaying the guidance screen in which the area other than the explicit area indicating the detection position of the tag is masked with the mask density according to the brightness. As a result, the display 114 displays the first image captured by the camera and the second image such as a mark image indicating the tag position updated as the own device moves.

As described above, in the second operation example, the processor of the wireless tag communication device searches for the RFID tag as the search target in the capturing range of the camera. During tag search, the processor 21 displays the second image such as the operation guidance on the display in the color according to the color information in the first image on the first image captured by the camera. As a result, the wireless tag communication device can display a guidance screen with easy-to-see operation guidance for searching for tags.

In the second operation example, the processor of the wireless tag communication device calculates the detection position of the tag using the detection result of the direction of the tag as the search target and the position of the own device. The processor displays the second image such as a mark image indicating the detection position of the tag on the first image captured by the camera in the color according to the color information in the first image. As a result, the wireless tag communication device can display the guidance screen in which guidance such as the detection position of the tag is easy to see and the position of the tag as the search target is intuitively understandable.

In the embodiment described above, the case where the program executed by the processor is stored in advance in the memory in the device is described. However, the program executed by the processor may be downloaded from a network to the device, or installed from a storage medium to the device. Any storage medium such as a CD-ROM can be used as long as it can store the program and can be read by the device. Also, the functions obtained by installing or downloading in advance may be implemented in cooperation with an operating system (OS) or the like in the device.

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit of the embodiments. The accompanying claims and their equivalents are intended to cover such forms or modifications as would fall within the scope and spirit of the embodiments.

What is claimed is:

1. A wireless tag communication device, comprising:
   an antenna configured to transmit electromagnetic waves in a first direction in which directivity of the antenna is maximized;
   a communication control circuit configured to communicate with a wireless tag via the antenna;
   a camera configured to capture a first image in a capturing direction which coincides with the first direction;
   a sensor configured to detect brightness in the first image and provide a sensor value based on the brightness; and
   a processor configured to:
      calculate a detection position of the wireless tag as a search target in the first image, and
      control to display on a display the first image and a second image,
   the second image being one in which the first image is masked with a mask density according to the sensor value detected by the sensor in an area other than an explicit area with the detection position of the wireless tag as a base point.

2. The device according to claim 1, wherein
   the processor is configured to:
      calculate a distance between the wireless tag as the search target and a position of the wireless tag communication device, and
      change a size of the explicit area according to the calculated distance.

3. The device according to claim 1, where the antenna with directivity includes a planar antenna.

4. The device according to claim 1, further comprising:
   a motion sensor configured to detect motion of the wireless tag communication device.

5. The device according to claim 4, wherein the motion sensor is one of an acceleration sensor, a gyro sensor, or a geomagnetism sensor.

6. The device according to claim 1, wherein the wireless tag communication device is one of a handheld device or a device configured to mount to a moving body.

7. The device according to claim 1, wherein a direction of the directivity of the antenna is a direction from a front of the camera.

8. The device according to claim 2, wherein the calculation of the position of the wireless tag communication device is based on spatial recognition.

9. A wireless tag communication device, comprising:
   an antenna configured to transmit electromagnetic waves in a first direction in which directivity of the antenna is maximized;
   a communication control circuit configured to communicate with a wireless tag via the antenna;
   a camera configured to capture a first image in a capturing direction which coincides with the first direction; and
   a processor configured to:
      set a color of a second image to be displayed superimposed on the first image based on color information in the first image captured by the camera, and
      display on a display the first image and the second image with the color set according to the color information in the first image in a superimposing manner.

10. The device according to claim 9, wherein
    the processor is configured to:
       calculate a detection position of the wireless tag as a search target in the first image, and
       display the second image shown at the detection position of the wireless tag on the display in the color set based on the color information of the first image.

11. The device according to claim 9, wherein
    the processor is configured to:
       divide the first image into a plurality of areas and
       set a color of the second image based on color information in an image of each divided area.

12. The device according to claim 9, wherein the wireless tag communication device is one of a handheld device or a device configured to mount to a moving body.

13. The device according to claim 9, wherein a direction of the directivity of the antenna is a direction from a front of the camera.

14. A method using a wireless tag communication device, the method comprising:
    communicating with a wireless tag via an antenna configured to transmit electromagnetic waves in a first direction in which directivity of the antenna is maximized;
    capturing a first image in a capturing direction which coincides with the first direction;
    setting a color of a second image to be displayed superimposed on the first image based on captured color information in the first image; and
    displaying on a display the first image and the second image with the color set according to the color information in the first image in a superimposing manner.

15. The method according to claim 14, further comprising:
    calculating a detection position of the wireless tag as a search target in the first image, and
    displaying the second image shown at the detection position of the wireless tag on the display in the color set based on the color information of the first image.

16. The method according to claim 14, further comprising:
    dividing the first image into a plurality of areas and setting a color of the second image based on color information in an image of each divided area.

\* \* \* \* \*